United States Patent
Buchholz et al.

(10) Patent No.: US 8,652,633 B2
(45) Date of Patent: Feb. 18, 2014

(54) NANOPARTICULATE WAX DISPERSIONS, PROCESS FOR PREPARING THEM AND METHOD OF HYDROPHOBICIZING MATERIALS USING THEM

(75) Inventors: Thomas Buchholz, Reppenstedt (DE); Hans Jörg Scheidat, Norderstedt (DE)

(73) Assignee: Sasol Wax GmbH, Hamburg (DE)

( * ) Notice: Subject to any disclaimer, the term of this patent is extended or adjusted under 35 U.S.C. 154(b) by 926 days.

(21) Appl. No.: 12/295,526

(22) PCT Filed: Mar. 28, 2007

(86) PCT No.: PCT/DE2007/000570
§ 371 (c)(1),
(2), (4) Date: Feb. 17, 2009

(87) PCT Pub. No.: WO2007/115534
PCT Pub. Date: Oct. 18, 2007

(65) Prior Publication Data
US 2009/0197105 A1 Aug. 6, 2009

(30) Foreign Application Priority Data
Mar. 31, 2006 (DE) .......................... 10 2006 015 517

(51) Int. Cl.
*B32B 5/06* (2006.01)
(52) U.S. Cl.
USPC .......................................... 428/326; 106/271
(58) Field of Classification Search
USPC .......................................... 428/326; 106/271
See application file for complete search history.

(56) References Cited

U.S. PATENT DOCUMENTS

| | | | |
|---|---|---|---|
| 2,993,800 A | 7/1961 | Pickell, et al. | |
| 3,005,853 A | 10/1961 | Wilgus el al. | |
| 3,442,676 A | 5/1969 | Belfort | |
| 4,117,199 A | 9/1978 | Gotoh et al. | |
| 4,714,727 A | 12/1987 | Hume, III | |
| 5,743,949 A | 4/1998 | Kainz | |
| 6,028,133 A | 2/2000 | Peek et al. | |
| 6,066,201 A | 5/2000 | Wantling | |
| 6,183,849 B1 | 2/2001 | Lindsay et al. | |
| 6,274,199 B1 | 8/2001 | Preston et al. | |
| 6,753,035 B2 | 6/2004 | Laks et al. | |
| 6,835,768 B2 | 12/2004 | Agur et al. | |
| 6,936,396 B2 | 8/2005 | Patel | |
| 2002/0143085 A1 | 10/2002 | Yoshida et al. | |
| 2004/0044108 A1 * | 3/2004 | Agur et al. | 524/277 |
| 2006/0030629 A1 | 2/2006 | Wantling et al. | |
| 2009/0318617 A1 * | 12/2009 | Dyllick-Brenzinger et al. | 524/740 |

FOREIGN PATENT DOCUMENTS

| | | |
|---|---|---|
| DE | 19546073 A1 | 6/1997 |
| DE | 19837191 A1 | 2/2000 |
| DE | 10158838 A1 | 6/2003 |
| EP | 0101007 A2 | 2/1984 |
| EP | 1448345 B1 | 3/2005 |
| WO | 03 045646 * | 6/2003 |
| WO | WO 2006/117160 A1 | 11/2006 |

OTHER PUBLICATIONS

WO 03 045646 machine translation.*
Roffael, E., Hydrophobierung von Spanplatten mit Paraffinen, Adhasion 11(1982),S. 10-19, Teil 1.
Roffael, E., Hydrophobierung von Spanplatten mit Paraffinen, Adhasion 28,(1,2), 17-21, Teil 4, (1984).
Holz-Zentralblatt, Hohere Hydrophobierungswirkung mit Synthetisch Hergestellten Wachsen nach dem Fischer-Tropsch-Verfahren, Jan. 14, 2005, pp. 66-67.
Holz-Zentralblatt, Olemulsionsgeschaft von Exxon Mobil Ubernommen, Sep. 12, 2003, No. 73, p. 1007-1008.

* cited by examiner

*Primary Examiner* — Kuo-Laing Peng
(74) *Attorney, Agent, or Firm* — Bushman & Associates, P.C.

(57) ABSTRACT

The invention provides nanoparticulate wax dispersions comprising wax solids having a solidification point of greater than 40 to 150° C., a process for preparing them, and a method of hydrophobicizing materials produced using fibers, chips or strands comprising or consisting of lignocelluloses and/or celluloses, by contacting them with the wax dispersions.

25 Claims, No Drawings

NANOPARTICULATE WAX DISPERSIONS, PROCESS FOR PREPARING THEM AND METHOD OF HYDROPHOBICIZING MATERIALS USING THEM

CROSS REFERENCE TO RELATED APPLICATION

This application is a national phase of International Application PCT/DE2007/000570 filed on 28 Mar. 2007, which claims the priority of DE 10 2006 015 517.3 filed on 31 Mar. 2006, the disclosures of which are incorporated herein by reference for all purposes.

BACKGROUND OF THE INVENTION

1. Field of the Invention

The invention relates to nanoparticulate wax dispersions, a process for preparing them and a method for hydrophobing materials based on lignocelluloses and/or celluloses by means of contacting them with the wax dispersions.

2. Description of the Prior Art

It is frequently desired to reduce the water absorption and swelling tendency of absorbent materials such as wood-based materials or paper/cardboard products, or statutory provisions or customer requirements make it necessary to remain under the limits for water absorption and swelling tendency of such materials or processing products thereof. According to applicable European standards (DIN EN 622 and DIN EN 312), wood-based materials for example have to comply with certain requirements regarding the swelling in thickness during underwater storage and with regard to water absorption.

In order to comply with the required limits, many absorbent materials are provided with hydrophobing agents during the production process. The hydrophobing agent itself should not necessitate unnecessary water introduction and should not interfere with further processing of the material, especially if the hydrophobed feed materials are present in form of chippings, strands or fibers and the processing products are made from the strands, chippings or fibers by joining them together, for example by means of thermal setting, compressing or bonding with suitable binding agents.

The application of waxes onto or into such materials or feed materials thereof containing or consisting of lignocelluloses and/or celluloses as hydrophobing agents, also in form of aqueous dispersions, is known in principle. Optimization of the hydrophobing effect of wax dispersions, when used for example in wood-based materials, has until now primarily been effected by modification of the composition of the wax phase (compare EP 1 448 345-B1).

For hydrophobing wood-based materials consisting of lignocelluloses with paraffin, a number of studies are known. In this connection, it should be referred to the article by Roffael, E., Schriever, E., May, H.-A., Adhäsion 11 (1982), pp. 10-19, "Hydrophobierung von Spanplatten mit Paraffin", Teil 1 and to the publication by May, H.-A. and Roffael, E. "Hydrophobierung von Spanplatten mit Paraffin", Teil 4 (Adhäsion 28, (1, 2), 17-21). However, further improvements are desirable.

SUMMARY OF THE INVENTION

It is the object of the present invention to develop a hydrophobing agent in form of a water-based wax dispersion that has a better hydrophobing effect with the same added amount of wax compared to conventional wax dispersions or allows for a reduced addition of hydrophobing agent with the same level of hydrophobing. At the same time, the water-based wax dispersions should have a high weight percentage of dispersed wax phase, a long shelf life, and should be shear stable.

The above object is solved by the wax dispersion according to the invention and the claimed process according to the independent claims. Preferred embodiments are subject matter of the sub-ordinate claims or subsequently explained.

DESCRIPTION OF PREFERRED EMBODIMENTS

The wax dispersions according to the invention comprise:
from less than 70% by weight to 30% by weight of water as continuous phase,
from greater than 0.5 to 10% by weight of at least one emulsifier, and
from greater than 20 to 80% by weight of waxes forming the dispersed phase, where
the waxes consist to greater than 85% by weight, preferably greater than 99.8% by weight, of one or more long-chain hydrocarbons having on average more than 20 carbon atoms,
the waxes have a solidification point of greater than 40 to 150° C., and
the dispersed waxes have as solid particles an average particle diameter of 10 to less than 500 mm.

Particularly suitable are the above wax dispersions having from less than 60 to 20% by weight, more preferably from less than 50 to 30% by weight or even only 40 to 20% by weight of water as continuous phase,
from greater than 0.5 to 6% by weight of one emulsifier, and
from greater than 40 to 80% by weight, more preferably from greater than 50 to 70% by weight or even 60 to 80% by weight of wax solids as dispersed phase.

The emulsifier preferably comprises or consists of one or more anionic emulsifiers. This may be fatty acids, saponified fatty acids and/or fatty acid derivatives having carboxyl groups that are optionally saponified.

The continuous phase of the wax dispersions is water; the discontinuous phase is wax, the wax consisting essentially, preferably completely, of long-chain hydrocarbons. For the purpose of the present invention, hydrocarbons are compounds consisting exclusively of carbon and hydrogen and having solidification points of greater than 40 to 150° C., preferably 40 to 100° C. (at standard pressure), in particular with average C-numbers of 20 to 100 carbon atoms, more preferably 20 to 50 carbon atoms. Suitable as hydrocarbons are saturated or unsaturated hydrocarbons, preferably saturated hydrocarbons.

The wax may be a petroleum-based paraffin wax, a Fischer-Tropsch wax, a polyolefin wax, may consist of a mixture thereof, and/or may be a refining product thereof. Subsequently, types suitable for use according to the invention are described.

The long-chain saturated aliphatic hydrocarbons are often referred to as paraffin waxes. The paraffin waxes typically used in the industry are products of petroleum refining and mainly consist of mixtures of n-alkanes and iso-alkanes that are solids above 40° C. in different quantitative ratios.

Usable paraffin waxes may be divided into macro- and microcrystalline waxes. Macrocrystalline waxes consist predominantly of saturated, straight-chain, unbranched hydrocarbons (n-alkanes) and have a molecular weight approximately in the range between 280 and 700 (g/mol) (number of carbon atoms in the chain is between 20 and approximately 50).

Unlike macrocrystalline paraffins, microcrystalline paraffins predominantly consist of branched alkanes (iso-alkanes) and saturated cyclic hydrocarbons (cycloalkanes). The melting range is between 60° C. and 90° C. Microcrystalline paraffins are also obtainable by hydroisomerization of Fischer-Tropsch waxes.

The dispersion is stabilized with an emulsifier. Emulsifiers are surface-active amphoteric substances or high molecular weight substances. The emulsifier may be anionic, cationic, non-ionogenic or have a betaine structure, preferably it is anionic. As emulsifiers should be mentioned:

alcohol polyethylene glycol ethers, for example those of the general formula $$R\text{—}O\text{—}(R^1\text{—}O)_n\text{—}H,$$

fatty acid ester polyethylene glycol ethers, for example those of the general formula $$R\text{—}COO\text{—}(R^1\text{—}O)_n\text{—}H,$$

alkyl polyalkylene glycol ether carboxylic acids, for example those of the general formula $R\text{—}O\text{—}(R^1\text{—}O)_n\text{—}CH_2\text{—}COOH$ or alkanol ammonium or alkali or alkaline earth metal salts thereof, alkyl amido alkyl betaines, for example those of the general formula $R\text{—}CONH(CH_2)_u N^+(CH_3)_2\text{—}CH_2\text{—}COO^-$, amine oxides, for example those of the general formula $$R\text{—}NO(CH_3)_2,$$

where in each case
  R represents a branched or linear, saturated or unsaturated $C_8$- to $C_{20}$- or $C_7$- to $C_{19}$-hydrocarbon radical,
  n represents a number from 2 to 20,
  $R^1$ represents an alkylene radical having 2 to 4 hydrocarbons, for example —$C_2H_4$— or —$C_3H_6$—, optionally different for each n, and
  u represents a number from 1 to 10,
  products from the alkoxylation of triglycerides that are fully or partially esterified with $C_6$- to $C_{22}$-fatty acids, per mol of triglyceride 2 to 40 mol of alkoxylation agent being used,
  partially neutralized partial glycerides of monovalent or multivalent C2- to C22-carboxylic acids, such as for example linolic acid, stearic acid, isostearic acid, palmitinic acid, lauric acid, caprylic acid, caprinic acid, citric acid and/or lactic acid,
  esters of polyglycerol, where the carboxylic acid group preferably has 2 to 22 carbon atoms,
  C6- to C32-carboxylic acids, in particular C8- to C26-fatty acids that are completely or partially, more preferably completely saponified, for example with amines or amine compounds such as diethanol amine.

For the purpose of the invention, emulsifiers are also high molecular weight substances such as gum arabic, gum ghatti or cellulose compounds.

Emulsifier mixtures, for example an anionic and a non-ionic or an anionic and a high molecular weight emulsifier, are also possible. The emulsifiers are added in an amount of 0.2 to 10% by weight, more preferably 2 to 6% by weight, based on the total composition. Anionic emulsifiers are preferably used, in particular exclusively anionic emulsifiers (i.e. no additional surfactants or emulsifiers, or if percent by weight specifications have been made regarding this, then these refer to the sum of emulsifiers and surfactants). Compared to the PIT method for preparing emulsifiers, with the method according to the invention for preparing nanoparticulate wax dispersions, surprisingly small amounts of emulsifiers are needed. This is advantageous for the use of the wax dispersions as hydrophobing agent.

In conventional wax dispersions, the particles are present in sizes from a few μm up to more than 500 μm. Depending on the emulsifier/stabilizer system used, they show a high susceptibility to shear forces. This necessitates a careful selection of the pumps used.

Subject matter of the invention are aqueous wax dispersions which, as dispersed phase, exhibit solid particles having average particles diameters of 10 to 500 nm, preferably 50 to 250 nm, and more preferably 100 to 200 nm.

The emulsification process may normally be divided into the following stages: pre-mixing of the individual components into a coarsely dispersed pre-emulsion (premix) and fine emulsification by means of droplet break-up upon exceeding the critical deformation and stabilization of the newly formed interfaces by the emulsifier.

As emulsifying apparatus, a rotor-stator mixer should be mentioned. Rotating parts contribute the energy effecting the size reduction. They may be operated in a batch-wise or quasi-continuous fashion and allow the combination of different process steps in one process apparatus (such as mixing of the components, emulsification and specific temperature control for pasteurizing and/or cooling).

High-pressure homogenizers are based on a high-pressure pump and a homogenizing nozzle. The high-pressure pump builds up the energy that may then be used for droplet size reduction by stress relief in the homogenizing valve.

Pressures of one hundred up to several hundred bar are applicable in the high-pressure homogenizers, in special cases up to one thousand bar. The raw emulsion is pumped through a centrical inlet borehole and then passes through the radial gap between valve seat and valve piston. In order to be able to achieve small droplets and a narrow dwell time distribution, a multiplicity of different nozzle geometries is possible. Examples for suitable radial diffusers are flat nozzle, tooth nozzle and knife edge nozzle.

In opposed jet dispersers (Nanojets, Microfluidizers®), two or more jets of raw emulsion from at least two opposing boreholes or channels collide. In addition, a jet disperser or a simple orifice plate or a combination of several orifice plates having different diameters may be used as homogenizing nozzle. Opposed jet dispersers do not have moving parts and their design is simple.

The present waxes that are difficult to reduce in size by means of conventional milling techniques may be transformed into finely divided dispersions by melt emulsification, for example by means of a high-pressure homogenizer and a homogenizing pressure of 120 bar.

Paraffins as solid wax or in form of dispersions are added during the production of wood-based materials on the basis of strands, chippings or fibers in order to cause the hydrophobing thereof, in particular in form of boards, and to primarily reduce water absorption and swelling caused thereby. As measured value, the swelling in thickness after 2 h and after 24 h of storage in water is often used (for example according to DIN EN 622 and DIN EN 312).

The hydrophobing is supposed to counteract a reduction of the mechanical strengths under the influence of moisture and help avoid linear or thickness expansions with higher ambient humidity.

The paraffin waxes slow down the water absorption and the speed of the swelling in thickness during underwater storage. In addition to the actual hydrophobing effect, the paraffin waxes also improve the slip of the chippings, strands or fibers. This has a positive effect on the transportability and spreadability of the chippings, strands or fibers.

Direct application of hot molten paraffin waxes has the advantage of cutting down on emulsifiers and stabilizers and, as opposed to aqueous dispersions, does not require addition of water together with the wax during addition. A disadvantage is the necessity of heated conduit and metering systems as well as the difficulties in achieving a uniform distribution of the in terms of volume small amounts of paraffin waxes on the chippings. The emulsifier normally counteracts hydrophobing. The goal is therefore to manage with as little emulsifier as possible in the dispersion.

In the present invention, the paraffin waxes are applied to the chippings in form of an aqueous dispersion. The paraffin wax dispersions may be both sprayed on as mixture with the binding agent and applied separately to the chippings, strands or fibers prior to or after addition of the binding agent.

The paraffin waxes should have no or little influence on the setting of the covering layer (CL) and/or intermediate layer glues. Common are acid-hardening urea-formaldehyde resins, alkaline hardening phenol-formaldehyde resins, PMDI or tannin-formaldehyde resins.

Test Description

An aqueous paraffin wax dispersion with 60% by weight solids content on the basis of a petroleum-based wax was prepared. For the preparation of a pre-dispersion (premix), the required amount of water having a temperature of about 80° C. was added to a stirred vessel.

The emulsifier (a C20-fatty acid and diethanol amine) was added to the water while stirring and reacted. Afterwards, the respective amount of molten paraffin wax was added while stirring. With stirring, a pre-emulsion formed after about 5 minutes.

The pre-emulsion was now processed into wax dispersion (A) using a high-pressure homogenizer with tooth nozzle at about 120 bar with subsequent cooling. A portion of wax dispersion (A) was heated, and to further reduce the particle size further processed into wax dispersion (B) with an opposed jet disperser (Microfluidizer®) at 1000 bar and subsequent cooling.

The particle size distribution was determined using the method of laser diffraction.

(A) Hydrophobing Wood Fibers

In each case, 0.5% by weight of the above paraffin wax dispersion, based on the fibrous material, was sprayed onto test sheets. Subsequently, the fibrous material was dried at 90° C. and the wax dispersion flocculated. The fibrous materials were now tested according to the method for measuring the wettability of wood fibers described by E. Raffael, et al. (Holz als Roh-und Werkstoff, Volume 60 (2002), pp. 347-348, Springer Verlag). 10 measurements per variant were performed. The test sheets were stored for 24 h under standard environmental conditions (20° C./65% relative humidity according to DIN 50014). The slower the penetration of the water droplets into the prepared test sheets, the stronger is the hydrophobing effect of the paraffin wax dispersion.

Surprisingly, it became apparent that these new dispersions display a significantly improved hydrophobing effect and have longer shelf lives compared to wax dispersions of the same kind with conventional particle size. By reducing the particle size, the wetting time could be improved by 38% compared to the same dispersion with common particle size.

Comparison of the Characteristics of the Dispersions
Table 1

TABLE 2

| | Dispersions | |
|---|---|---|
| | A | B |
| Water | 40% by weight | 40% by weight |
| Wax (petroleum-based paraffin wax) | identical | |
| Emulsifier | 5% by weight | 5% by weight |
| Emulsifier anionic according to Example | identical | |
| Particle size: | about 1 µm | about 150 nm |
| Viscosity (25° C., Brookfield): | 1760 mPas | 2060 mPas |
| Centrifuge test 1 h | 1% | 0% |
| Centrifuge test 4 h | 4% | <0.5% |
| Prolongation of wettability | +7.9 sec. | +10.9 sec. |

| | A | B |
|---|---|---|
| | µm | µm |
| $x_{10,3}$ | 0.576 | 0.0932 |
| $x_{50,3}$ | 1.094 | 0.185 |
| $x_{90,3}$ | 1.669 | 0.400 |
| $X_{3,2}$ | 0.941 | 0.163 |

Sample A average particle diameter about 1 micron
Sample B average particle diameter about 150 nm
$x_{10,3}, x_{50,3}$ and $x_{90,3}$ refer to the weight percentage of the particle collective that fall below the specified particle diameter,
$X_{3,2}$ refers to the Sauter Mean Diameter The centrifuge had g=3200. A sample of the emulsion was subjected to an acceleration due to gravity of g=3200 for a period of 1 h and 4 h. The proportion of separated water is determined in % of sample height. The centrifuge test is a good measure for the storage stability of the emulsion. The wettability measures the time interval from applying a colored water droplet to complete penetration. Wettability is a method to evaluate hydrophobing.

The invention claimed is:

1. A wax dispersion for use as a hydrophobing agent for a composition comprised of wood-based material(s) containing fibers, chippings, strands or mixtures thereof containing lignocelluloses, and a binding agent, containing the wax dispersion comprising
    from less than 60% by weight to 20% by weight of water as continuous phase,
    from greater than 0.5 to 10% by weight of at least one emulsifier, and
    from greater than 40 to 80% by weight of waxes forming the dispersed phase, where
    the waxes comprise greater than 85% by weight of one or more long-chain hydrocarbons having on average more than 20 carbon atoms,
    the waxes have a solidification point of greater than 40 to 150° C., and
    the dispersed waxes being solid particles having an average particle diameter of 10 to less than 500 nm.

2. The wax dispersion according to claim 1, characterized in that the wax dispersion comprises
    from less than 50 to 30% by weight of water as continuous phase,
    from greater than 0.5 to 6% by weight of one emulsifier, and
    from greater than 50 to 70% by weight of wax solids as dispersed phase.

3. The wax dispersion according to any one of claims 1 or 2, characterized in that the waxes are long-chain saturated hydrocarbons, Fischer-Tropsch waxes, polyolefin waxes, paraffin waxes obtained from petroleum, and mixtures thereof.

4. The wax dispersion according to any one of claims 1 or 2, characterized in that the hydrocarbons comprise greater than 60% by weight of n-alkanes.

5. The wax dispersion according to any one of claims 1 or 2, characterized in that the wax solids have a solidification point of greater than 40 to 100° C.

6. The wax dispersion according to any one of claims 1 or 2, characterized in that the emulsifiers are anionic emulsifiers.

7. The wax dispersion according to claim 6, wherein the ionic emulsifier is selected from the group of fatty acids, saponified fatty acids, fatty acid derivatives that are optionally saponified and mixtures thereof.

8. The wax dispersion according to any one of claims 1 or 2, characterized in that solid particles with an average particle diameter of 10 to less than 250 nm are dispersed in the continuous phase.

9. The wax dispersion according to claim 8, wherein the solid particles have an average particle diameter of 100 to 200 nm.

10. The wax dispersion according to any one of claims 1 or 2, containing greater than 0.5 to less than 6% by weight of emulsifier.

11. The wax dispersion according to any one of claims 1 or 2, characterized in that the emulsifier comprises greater than 50% by weight, based on the emulsifiers and/or surfactants used of C6- to C32-carboxylic acids that are at least partially saponified.

12. The wax dispersion according to claim 11, wherein the emulsifier comprises greater than 50% by weight of the combined amount of emulsifiers and surfactants and the C32-carboxylic acids are completely saponified.

13. The wax dispersion according to any one of claims 1 or 2, characterized in that the hydrocarbons comprise greater than 80% by weight of n-alkanes.

14. A composition comprising
wood-based material(s) containing fibers, chippings, strands or mixtures thereof containing lignocelluloses,
at least one binding agent for joining the wood-based material(s) together, the binding agent comprising acid-hardening urea-formaldehyde resins, alkaline hardening phenol-formaldehyde resins, PMDI or tannin-formaldehyde resins, and
at least one hydrophobing agent, said hydrophobing agent comprising:
from less than 60% by weight to 20% by weight of water as continuous phase,
from greater than 0.5 to 10% by weight of at least one emulsifier, and
from greater than 40 to 80% by weight of waxes forming the dispersed phase, where
the waxes consist to greater than 85% by weight of one or more long-chain hydrocarbons having on average more than 20 carbon atoms,
the waxes have a solidification point of 40 to 150° C., and
the dispersed waxes have as solid particles an average particle diameter of 10 to less than 500 nm.

15. A composition according to claims 14, characterized in that the wood-based material(s) comprises medium-density fiberboards, high-density fiberboards, OSB (Oriented Strand Boards) or chipboards.

16. A method for hydrophobing a wood-based composition comprising:
providing a wood-based material selected from fibers, chipping, strands, and mixtures thereof containing lignocelluloses; and
providing a wax dispersion comprising from less than 70% by weight to 30% by weight of water, from greater than 0.5 to 10% by weight of an emulsifier and from greater than 40 to 80% by weight waxes, the waxes having a solidification point of greater than 40 to 150° C., the waxes comprising one or more long-chain hydrocarbons having on average more than 20 carbon atoms and being dispersed in the continuous phase in the form of solid particles having an average particle diameter of 10 to less than 500 nm;
contacting the wood-based composition with the wax dispersion to produce a wax/wood-based composition;
applying binder to the wood-based composition; and
optionally adding additional substances into the wax/wood-based composition.

17. A method according to claim 16, characterized in that a wax dispersion is used that comprises
from less than 60% by weight to 20% by weight of water as continuous phase,
from greater than 0.5 to 10% by weight of at least one emulsifier, and
from greater than 40 to 80% by weight of waxes forming the dispersed phase, where
the waxes comprise greater than 85% by weight of one or more long-chain hydrocarbons having on average more than 20 carbon atoms.

18. A method according to any one of claims 16 or 17, characterized that contacting said wood-based material(s) takes place by spraying of the wax dispersion on the free flowing wood-based material(s).

19. A method according to any one of claims 16 or 17, characterized in that contacting said aggregate wood-based material(s) takes place by placing A said wood-based material(s) in water or slurrying B said wood-based material(s) together with the wax dispersion, and, if necessary, the wax dispersion is broken up in order to attach to the C wood-based material(s).

20. A method according to any one of claims 16 or 17, characterized in that the wood-based material(s) comprises medium-density fiberboards, high-density fiberboards, OSB (Oriented Strand Boards) or chipboards.

21. A method according to any one of claims 16 to 17, characterized in that the wood-based material(s) comprises cardboard, cardboard fiber mass or paper.

22. A method according to any one of claims 17 and 16, characterized in that based on the dry weight of the wood-based material(s), 0.1 to 5% by weight of wax solids are introduced.

23. A method for preparing a wax dispersion comprising:
providing a premix comprising from less than 60 to 20% by weight of water as a continuous phase, from greater than 0.5 to 10% by weight of at least one emulsifier, and from greater than 40 to 80% by weight of waxes forming the dispersed phase, said wax comprising one or more long-chain hydrocarbons having on average more than 20 carbon atoms, the wax being dispsersed in the continuous phase in the form of solid particles, the solid particles having an average particle diameter of 10 to less than 500 nm;
heating said premix above the melting point of wax to provide a molten wax mixture;

emulsifying the molten wax mixture using an opposed jet disperser and/or a jet disperser; and cooling the emulsified mixture below the solidification point.

24. A method according to claim 23, characterized in that the wax dispersion comprises from less than 50 to 30% by weight of water as continuous phase, from greater than 0.5 to 6% by weight of one emulsifier, and from greater than 50 to 70% by weight of wax solids as dispersed phase.

25. A method according to claim 23, characterized in that an opposed jet disperser is used.

* * * * *

UNITED STATES PATENT AND TRADEMARK OFFICE
CERTIFICATE OF CORRECTION

| | | |
|---|---|---|
| PATENT NO. | : 8,652,633 B2 | Page 1 of 1 |
| APPLICATION NO. | : 12/295526 | |
| DATED | : February 18, 2014 | |
| INVENTOR(S) | : Thomas Buchholz et al. | |

It is certified that error appears in the above-identified patent and that said Letters Patent is hereby corrected as shown below:

In the Claims:

At column 8, line 38, please delete "aggregate".

Signed and Sealed this
Twenty-second Day of July, 2014

Michelle K. Lee
*Deputy Director of the United States Patent and Trademark Office*